Nov. 7, 1939.  C. LAGERGREN  2,178,966
GREASE GUN ADAPTER
Filed March 16, 1938   2 Sheets-Sheet 1
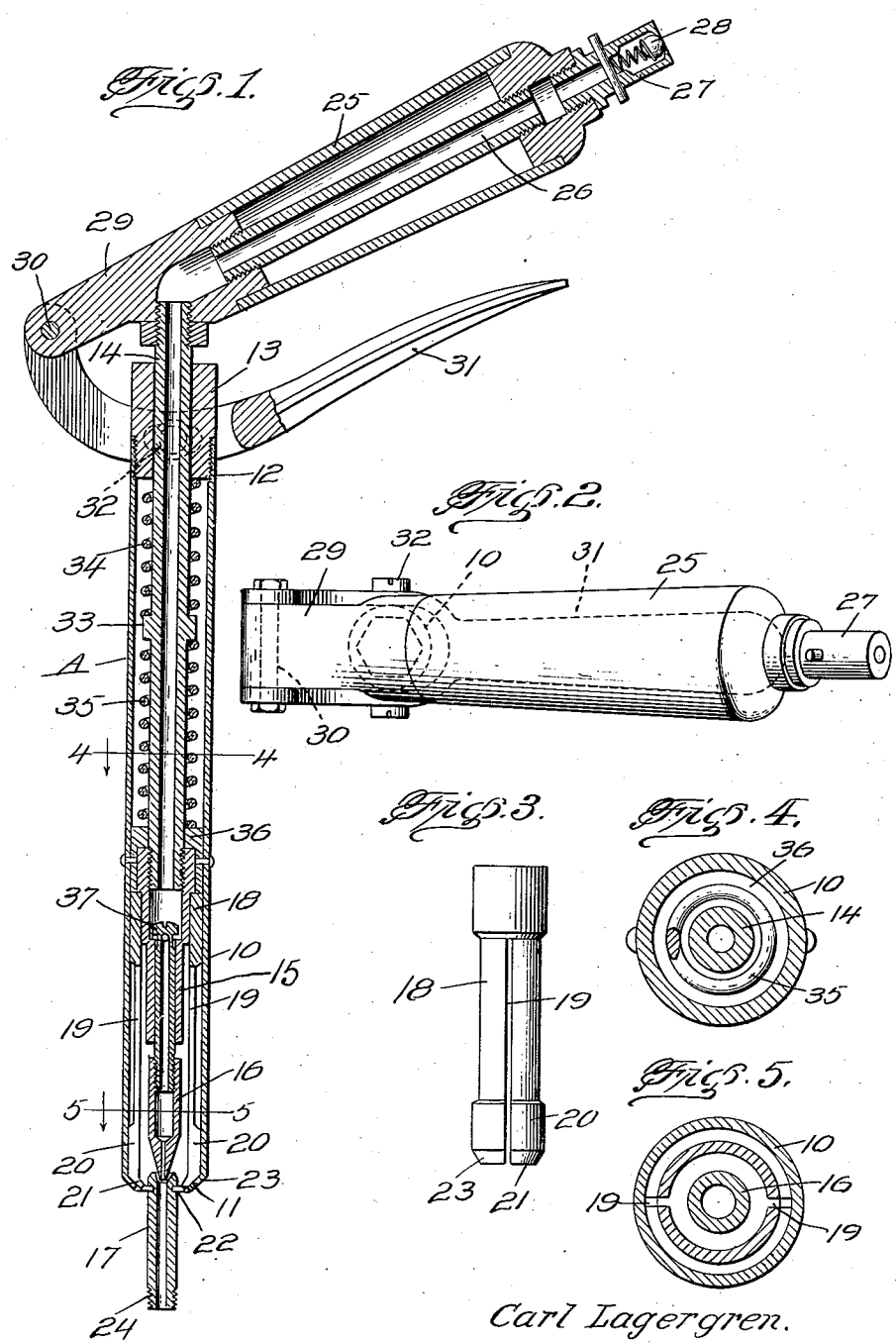
Carl Lagergren.
INVENTOR
BY Victor J. Evans & Co.
ATTORNEYS Nov. 7, 1939.　　　C. LAGERGREN　　　2,178,966
GREASE GUN ADAPTER
Filed March 16, 1938　　2 Sheets-Sheet 2
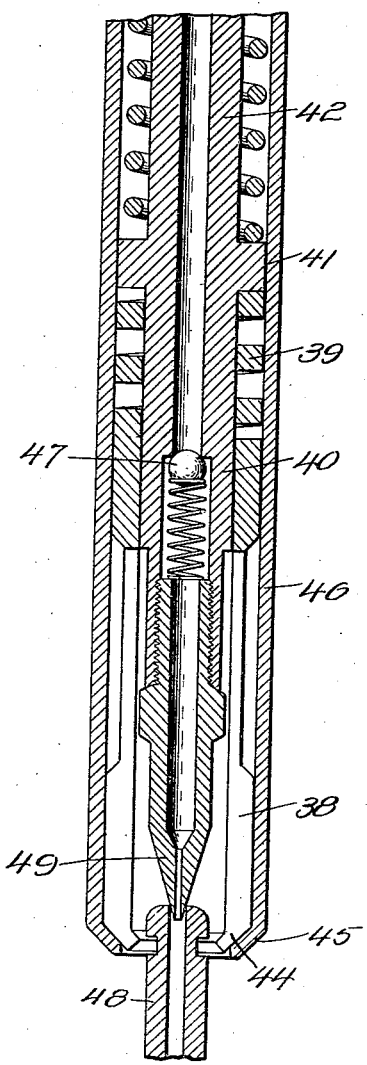
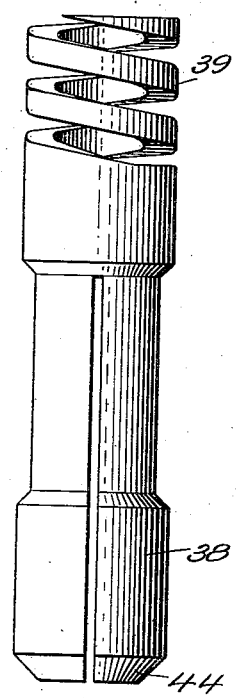
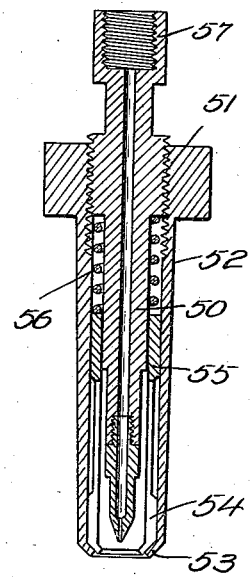
Carl Lagergren.
INVENTOR
BY Victor J. Evans & Co.
ATTORNEYS Patented Nov. 7, 1939

2,178,966

UNITED STATES PATENT OFFICE 2,178,966

GREASE GUN ADAPTER

Carl Lagergren, Osterville, Mass.

Application March 16, 1938, Serial No. 196,282

2 Claims. (Cl. 284—17)

The invention relates to a grease gun and more especially to an adapter for grease guns, nozzles or the like.

The primary object of the invention is the provision of an adapter of this character, wherein the lubricant gun or nozzle for lubricant can be firmly and securely coupled with a fitting adapted for the flow of grease or lubricant to parts of machinery particularly motor vehicles so that there will be no waste of grease or lubricant between the adapter and the fitting during the feeding of the grease or lubricant, the adapter being readily coupled with and uncoupled from the fitting either through mechanical or manual manipulation.

Another object of the invention is the provision of an adapter of this character, wherein the construction thereof is novel in form so that a perfect seal will be had when coupling the adapter to a fitting for supplying grease or lubricant to machinery, there being no possibility of accidental release or uncoupling of the adapter from the fitting while supplying grease or lubricant thereto.

A further object of the invention is the provision of an adapter of this character, wherein the flow of lubricant or grease therethrough will be shut off on the uncoupling of the adapter from a fitting through which grease or lubricant is supplied to machinery and in this manner eliminating waste of such lubricant or grease.

A still further object of the invention is the provision of an adapter of this character, which is simple in construction, thoroughly reliable and effective in operation, assuring quick coupling and uncoupling with a fitting, readily and easily handled, eliminating waste of lubricant or grease and inexpensive to manufacture.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 1 is a vertical longitudinal sectional view through an adapter of the pistol grip type constructed in accordance with the invention.

Figure 2 is an end elevation thereof.

Figure 3 is an elevation of the partly slit contractible and expansible coupling sleeve of the adapter.

Figure 4 is an enlarged sectional view on the line 4—4 of Figure 1 looking in the direction of the arrows.

Figure 5 is an enlarged sectional view on the line 5—5 of Figure 1 looking in the direction of the arrow.

Figure 6 is a fragmentary longitudinal sectional view of a slight modification.

Figure 7 is an elevation of the coupling sleeve thereof.

Figure 8 is a longitudinal sectional view through a further modification of adapter.

Similar reference characters indicate corresponding parts throughout the several views in the drawings.

Referring to the drawings in detail, particularly Figures 1 to 5 inclusive, A designates generally an adapter constructed in accordance with the invention and comprising a cylindrical outer casing or shell 10 having an inwardly curved or rounded contracted open outer end 11 and an internally threaded open end 12, respectively, the latter being fitted with a plug 13 which is threaded into the same and loosely surrounds for sliding movement a discharge tube 14 for lubricant or grease. The tube 14 is of less length than the casing or shell 10 and within the latter is joined a separable nozzle 15 carrying a removable outwardly tapered discharge tip 16 for engaging with a grease or lubricant nipple 17 constituting a fitting for machinery and supplying grease or lubricant thereto.

Within the casing or shell 10 and stationarily held about the nozzle 15 is an expansible and contractible coupling sleeve 18 which is formed with diametrically opposed longitudinal slits 19 extending for a major portion of the length thereof and opening through one end of the same, that is to say, the outer end 20 thereof so that this outer end 20 will constitute inherently resilient gripping jaws 21 for interlocking with the fitting 17, the latter being formed with an annular groove 22 for the entry of the jaws 21 therein on the contracting of the sleeve 18 in a manner presently described.

The sleeve 18 at the jaw end 20 is enlarged and is beveled at 23 so that when the casing or shell 10 is displaced or moved in one direction relative to the sleeve 18 the beveled portion 23 will coact with the contracted end 11 of the said shell or casing causing the jaws 21 to approach each other for lock coupling with the fitting 17 whence the tapered tip 16 will have entered the center passage 24 in the fitting 17 and in this manner a seal will be had between the adapter and the said fitting on the coupling of the adapter to the latter. Grease or lubricant under pressure will be forced through the tube 14, nozzle 15 and tip 16 into the passage 24 for the supplying of lubricant to machinery.

The tube 14 at the outer end thereof has detachably engaged thereon a handle or hand grip 25 having a feed pipe 26 interiorly thereof leading to the said tube 14 and this pipe outside of the handle or grip 25 is adapted for communication with an attaching nipple 27 on said grip or handle so that a flexible lubricant or grease hose may have connection with the grip or handle. The nipple 27 is equipped with a check return valve 28 to avoid back flow of lubricant or grease under pressure when supplied through the grip or handle 25, that is, the pipe 26 therein to the tube 14. The grip or handle 25 is fixed to the tube 14 to be disposed at an angle thereto and is formed with an extension 29 carrying a pivot 30 swingingly connecting a trigger 31 therewith. This trigger 31 is trunnioned by pivot fasteners 32 to diametrically opposite sides of the shell or casing 10 and thus by operating the trigger 31 the said shell or casing 10 can be shifted relative to the coupling sleeve 18 for the automatic and secure coupling of the adapter to the fitting 17.

Within the casing or shell 10 about the tube 14 at opposite sides of a shoulder 33 on the said tube are counteracting coiled retractile springs 34 and 35, respectively. The spring 35 acts upon a collar 36 fixed to and interiorly of the shell or casing 10 so that when the trigger is in released or normal position this spring 35 will urge the shell or casing in a direction to have the jaws 23 of the sleeve 18 open or expanded with relation to each other. The spring 34 acting between the plug 12 and the shoulder 33 maintains the sleeve at the end 20 in contact with the end 11 of the sleeve or shell 10. When the trigger 31 is pressed upon, the spring 35 will become compressed and the said end 11 will ride on the beveled portion 23 of the jaws 21 causing the closing of these jaws for the coupling action thereof with the fitting 17.

The nozzle 15 has within the same a suitable check valve 37 which is adapted to close and shut off the flow of lubricant or grease through the tip 16 when the same is released from the fitting 17 to avoid any possible escape or waste of lubricant or grease when the adapter is uncoupled from the said fitting 17 in the use of the adapter.

In Figure 6 of the drawings there is shown a modification of the invention, wherein the coupling sleeve 38 at its inner end is formed with a coiled expansion spring 39 and this sleeve is slidable upon the nozzle 40, the coiled spring 39 acting against a shoulder 41 on the tube 42 urging the said sleeve in a direction to have its end 44 brought into contact with the contracted open end 45 of the shell or casing 46. The nozzle has therein a spring pressed check valve 47 which is unseated when lubricant or grease is under pressure and flows through the tube 42 to be discharged into the fitting 48 when the tip 49 of said nozzle 40 is engaged with the fitting. This valve becomes seated to avoid back flow of lubricant or grease in the tube 42 when being forced into the fitting 48.

In Figure 8 of the drawings there is shown a further modification, wherein the nozzle 50 is formed with external screw threads 51 for the threaded engagement therewith of a tubular turn shell or casing 52 which has the contracted open end 53 coacting with the beveled end 54 of the coupling sleeve 55 which is slidably fitted on the said nozzle 50 and is tensioned by a coiled expansion spring 56. Thus the shell or casing 52 when rotated the threads 51 will feed the same so as to have the coupling sleeve 55 expand or contract for coupling and uncoupling action thereof with the fitting.

The shell or casing 46 as shown in Figure 6 of the drawings is controlled by the trigger 31 as is the shell or casing 10 in Figure 1 of the said drawings.

In Figure 8 of the drawings the nozzle 50 is formed with a coupling end 57 for detachable fitting with a hose so that lubricant or grease can be delivered under pressure into the said nozzle as is common in grease guns.

What is claimed is:

1. A device of the character described comprising a hand grip provided with a passage opening through one end and through one side spaced from the opposite end, a lubricant feed tube connected with the side opening in the grip, a cylindrical casing slidable relative to the tube and having a contracted open end, a plug embracing the tube and fixed to the casing at the end next to the grip, a collar fixed within the casing, a shoulder on the tube, retractile springs about the tube at opposite sides of the shoulder and engaging the plug and collar, respectively, a displaceable nozzle fitted with the tube and effecting an automatic lubricant discharge cut-off, a coupling sleeve coacting with the contracted open end of the casing and abutting the collar, and a lever straddling the casing and pivoted to the grip and plug, respectively, the lever and the grip being in close relation to each other.

2. A device of the character described comprising a hand grip provided with a passage opening through one end and through one side spaced from the opposite end, a lubricant feed tube connected with the side opening in the grip, a cylindrical casing slidable relative to the tube and having a contracted open end, a plug embracing the tube and fixed to the casing at the end next to the grip, a collar fixed within the casing, a shoulder on the tube, retractile springs about the tube at opposite sides of the shoulder and engaging the plug and collar, respectively, a displaceable nozzle fitted with the tube and effecting an automatic lubricant discharge cut-off, a coupling sleeve coacting with the contracted open end of the casing and abutting the collar, a lever straddling the casing and pivoted to the grip and plug, respectively, the lever and grip being in close relation to each other, and an outwardly tapered tip separably connected with the nozzle.

CARL LAGERGREN.